(12) United States Patent
Rolfe et al.

(10) Patent No.: US 6,481,039 B1
(45) Date of Patent: Nov. 19, 2002

(54) PASSENGER LOADING BRIDGE EXTENDING FROM A TERMINAL AT GROUND LEVEL AND FOR SERVICING AIRCRAFT OF VARIOUS SIZES

(75) Inventors: Daniel Rolfe, Carlsbad Springs (CA); John Savage, Gloucester (CA); Andrew Plummer, Manotick (CA); Ronald W. Wollenschlager, Ottawa (CA)

(73) Assignee: DEW Engineering and Development Limited, Ottawa (CA)

( * ) Notice: Subject to any disclaimer, the term of this patent is extended or adjusted under 35 U.S.C. 154(b) by 0 days.

(21) Appl. No.: 09/862,338

(22) Filed: May 23, 2001

(51) Int. Cl.$^7$ ................................................. E01D 1/00
(52) U.S. Cl. .......................................... 14/72.5; 14/71.5
(58) Field of Search ................................ 14/69.5, 71.1, 14/71.3, 71.5, 72.5

(56) References Cited

U.S. PATENT DOCUMENTS

| | | | | |
|---|---|---|---|---|
| 3,086,152 A | * | 4/1963 | Lodjic et al. | 14/72.5 |
| 3,123,167 A | * | 3/1964 | Lichti | 14/71.5 |
| 3,808,626 A | * | 5/1974 | Magill | 14/71.5 |
| 3,859,481 A | * | 1/1975 | Sprague | 14/71.5 |
| 4,318,198 A | * | 3/1982 | Drozd | 14/71.5 |
| 4,319,376 A | * | 3/1982 | Saunders | 14/71.5 |
| 5,443,677 A | * | 10/1985 | Haglund et al. | 14/71.5 |
| 4,559,660 A | * | 12/1985 | Lichti | 14/71.5 |
| 4,620,339 A | * | 11/1986 | Shepheard | 14/71.5 |
| 4,715,077 A | * | 12/1987 | Shepheard | 14/71.5 |
| 5,004,188 A | * | 4/1991 | Donneky et al. | 14/71.5 |
| 5,524,318 A | * | 6/1996 | Thomas | 14/72.5 |
| 5,667,018 A | * | 9/1997 | Hone et al. | 14/71.5 |
| 5,704,086 A | * | 1/1998 | Hansen et al. | 14/71.5 |
| 5,761,757 A | * | 6/1998 | Mitchell et al. | 14/71.5 |
| 5,950,266 A | * | 9/1999 | Streeter et al. | 14/69.5 |
| 6,212,724 B1 | * | 4/2001 | Zhou | 14/71.5 |

FOREIGN PATENT DOCUMENTS

GB 2092986 A * 12/1980 ............. B60P/1/02

* cited by examiner

*Primary Examiner*—Thomas B. Will
*Assistant Examiner*—Alexandra Pechhold
(74) *Attorney, Agent, or Firm*—Freedman & Associates

(57) ABSTRACT

An extensible loading bridge for passenger loading having at least two extensible sections for supporting aircraft from an airport terminal at ground level. A wheeled gantry is located at the aircraft facing end of the aircraft facing section. The gantry provides linear movement of the aircraft facing section along the walkway, arcuate movement about the substantially vertical axis and means for lifting or lowering the aircraft facing end of the aircraft facing section. The wheeled gantry allows lowering of the aircraft facing end of the bottom of the aircraft facing section to a height above ground being approximately equal or less than a gantry wheel diameter.

6 Claims, 11 Drawing Sheets

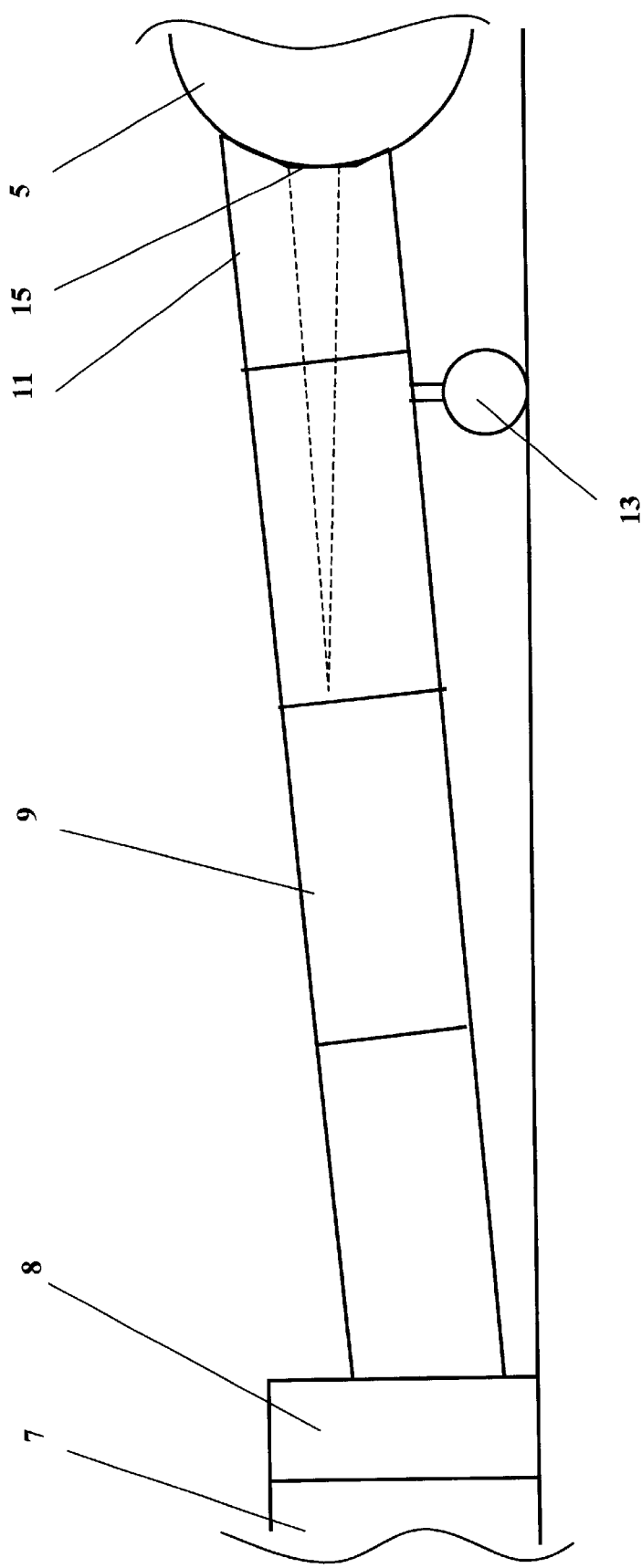

PASSENGER LOADING BRIDGE EXTENDING FROM A TERMINAL AT GROUND LEVEL AND FOR SERVICING AIRCRAFT OF VARIOUS SIZES

FIELD OF THE INVENTION

The invention relates generally to a passenger loading bridge, in particular an extensible loading bridge having three extensible sections extending from a terminal at ground level and for servicing aircraft of various sizes.

BACKGROUND OF THE INVENTION

Passenger loading bridges have gained world-wide acceptance for the safety and convenience they afford passengers. Most major air terminals are provided with gates, gangways or passenger loading bridges, which extend from the second level of the terminal to a parked aircraft. Frequently, these bridges are relatively immobile since aircraft can park close to the terminal and be moved away by tugs or tractors.

Commonly, smaller air terminals are only ground level structures at which aircraft park a fixed distance from the terminal building. There frequently are no tugs available. This fixed distance is required to enable the aircraft to "power out" or move away from the building under its own power without damaging the building with a jet or propeller blast, or a physical collision between the aircraft and the terminal. A loading bridge must be easily adjustable to the different distances during airport operation in order to service a number of different aircraft.

Commonly, passenger loading bridges extend from the second level of large terminals and have been directed to support standard size passenger and cargo aircraft. They have generally not been applicable for use with small air terminals for a number of reasons. For example, they do not provide the large extension/retraction required for supporting aircraft at small terminals. Large variation in the loading height of different common aircraft, also requires a loading bridge able to be adjusted over a wide range of heights. Currently available loading bridges cannot be lowered sufficiently to service smaller aircraft from ground level. It would be advantageous to provide a passenger loading bridge that is capable of mating with an airport terminal at ground level and with small as well as large aircraft.

Accordingly, passengers typically have had to walk from the terminal over airport tarmac and thence up a stairway in order to enter an aircraft at a small terminal. This exposes passengers to inclement weather and hazards such as propellers, cables, and fuelling hoses. It is not desirable to subject passengers to inclement weather or to potentially dangerous ramp conditions. Also, aircraft operations are significantly slowed by allowing passengers onto the tarmac. For safety reasons, aircraft and equipment remain stationary while passengers are on the tarmac. Security is a concern because passengers can board incorrect aircraft or tamper with other craft. In order to increase security, it is a common practice to board only one aircraft from the tarmac at any time. With passenger loading bridges in place, luggage is loaded, aircraft tests are executed, other aircraft are taxied, and so on while passengers board the aircraft. Other aircraft are capable of being boarded simultaneously when sufficient gates exist. It is therefore desirable to provide a passenger loading bridge for use at these smaller air terminals to enhance the safety and comfort of passengers.

When coupling available passenger loading bridges to large aircraft such as jumbo jets, a significant clearance exists between the aircraft entrance and various portions of a plane, which have to be accessed by service personnel such as doors for loading cargo, fuelling caps, ports for ventilation, electricity, etc. In smaller planes this clearance is reduced substantially. Here a gantry supporting the loading bridge located close to the aircraft interfacing end of the loading bridge is a serious safety hazard for service personnel and reduces the operating area around the plane considerably.

Therefore, it would be advantageous to provide a passenger loading bridge having the gantry a sufficiently large distance from the plane.

In U.S. Pat. No. 4,161,049 issued to Saunders et al. on Jul. 17, 1979, a passenger loading bridge for a ground level terminal is disclosed. Saunders provides a fixed length walkway, which swings about a ground level rotunda. In order to accommodate small aircraft, a stairway from the rotunda to the walkway is provided. The stairway permits an end of the walkway proximate the terminal to be raised to or above the minimum height of the supports for raising and lowering the end of the walkway proximate an aircraft and therefore allows the walkway to mate with aircraft entrances that are disposed in line with the minimum support height. The use of stairs to access an aircraft is undesirable because of limited access for the physically disabled and other liabilities associated with stairs. Further, Saunders provides an extensible cab portion for aligning the door of the aircraft to the loading bridge. However, the length of the bridge is not adjustable. As a result all aircraft must be parked at the maximum distance from the terminal. No significant adjustment to the placement of the cab of the loading bridge is possible.

It is therefore an object of the invention to provide a highly adjustable passenger or cargo loading bridge that can be advantageously utilized with small airport terminals.

It is another object of the invention to provide a passenger or cargo loading bridge extending from a terminal at ground level and for servicing aircraft of various sizes.

It is yet another object of the invention to provide a passenger or cargo loading bridge where the gantry supporting the loading bridge is located a sufficiently large distance from a serviced plane.

SUMMARY OF THE INVENTION

In accordance with the present invention there is provided a passenger loading bridge for conducting passengers or cargo from an airport terminal to an aircraft entry door of an aircraft comprising:

a pivotal support for pivotal movement about a substantially vertical axis;

an extensible walkway connected to the pivotal support for communicating at one end with the airport terminal at ground level and having an aircraft engaging end at an opposite end, the walkway comprising:

a first section for communicating with the airport terminal; and, a second section connected to the first section providing first telescopic movement for extending and retracting the aircraft engaging end; and, a wheeled gantry having a support member disposed for supporting the second section for providing steerable movement of the second section and for lifting or lowering the aircraft facing end of the second section, wherein placement of the wheels of the wheeled gantry allows for lowering of the gantry support member to a height above ground being approximately equal or less than a gantry wheel diameter.

In accordance with an aspect of the present invention there is provided a wheeled gantry comprising:
- a support beam for supporting a lift mechanism, the lift mechanism for adjusting a distance between the support beam and the bottom of the second section;
- a steering mechanism mounted to the support beam for steering between the linear movement and the arcuate movement of the second section; and,
- a wheel axle mounted to the steering mechanism, the wheel axle comprising two wheels rotationally mounted to either end of the wheel axle, for providing linear and arcuate movement to the second section, wherein the distance between the two wheels exceeds the length of the support beam.

In accordance with the aspect of the present invention there is further provided a wheeled gantry comprising:
- a support beam for supporting a lift mechanism, the lift mechanism for adjusting a distance between the support beam and the bottom of the second section;
- a steering mechanism mounted to the support beam for steering between the linear movement and the arcuate movement of the second section; and,
- a frame structure mounted to the steering mechanism, the frame structure comprising two wheel axles, each wheel axle comprising two wheels rotationally mounted to either end of each wheel axle, for providing linear and arcuate movement to the second section, wherein the distance between the two wheels of each wheel axle exceeds the length of the support beam.

In accordance with an aspect of the present invention there is further provided another embodiment of a wheeled gantry comprising:
- a support beam for supporting a lift mechanism, the lift mechanism for adjusting a distance between the support beam and the bottom of the second section, wherein the support beam forms a U-shape surrounding the bottom portion of the second section of the walkway and wherein the support beam comprises a cantilever mounted to either end;
- a steering mechanism mounted to each cantilever for steering between the linear movement and the arcuate movement of the second section; and,
- a wheel axle mounted to each steering mechanism, the wheel axle comprising at least a wheel rotationally mounted to the wheel axle, for providing linear and arcuate movement to the second section.

In accordance with the aspect of the present invention there is further provided yet another embodiment of a wheeled gantry comprising:
- a support beam for supporting a lift mechanism, the lift mechanism for adjusting a distance between the support beam and the bottom of the second section, wherein the support beam forms a U-shape surrounding the top and the sides of the second section of the walkway and wherein the support beam comprises a cantilever mounted to either end;
- a steering mechanism mounted to each cantilever for steering between the linear movement and the arcuate movement of the second section; and,
- a wheel axle mounted to each steering mechanism, the wheel axle comprising at least a wheel rotationally mounted to the wheel axle, for providing linear and arcuate movement to the second section.

In accordance with the present invention there is further provided a passenger loading bridge for conducting passengers or cargo from an airport terminal to an aircraft entry door of an aircraft comprising:
an extensible walkway for communicating at a first end with the airport terminal at ground level and having an aircraft engaging end at an opposite end, the walkway comprising:
- a first section including a pivotal support for pivotal movement about a substantially vertical axis proximate the first end and for communicating with the airport terminal; and,
- a second section connected to the first section providing first telescopic movement for extending and retracting the aircraft engaging end;
- a wheeled gantry mounted to the second section for providing steerable movement of the second section and for lifting or lowering the aircraft facing end of the second section, the wheeled gantry comprising:
  - a wheel axle comprising two wheels mounted to either end of the wheel axle, for providing driven movement to the second section;
  - a steering axle mounted to the wheel axle for steering between the linear movement and the arcuate movement of the second section;
  - a support beam mounted to the steering axle for supporting a lift mechanism, the lift mechanism for adjusting a distance between the support beam and the bottom of the second section, wherein the support beam is disposed between the two wheels at a height above ground less than the diameter of the two wheels; and,
  - a drive mechanism for driving the two wheels.

In accordance with the present invention there is yet further provided a passenger loading bridge for conducting passengers or cargo from an airport terminal to an aircraft entry door of an aircraft comprising:
an extensible walkway for communicating at a first end with the airport terminal at ground level and having an aircraft engaging end at an opposite end, the walkway comprising:
- a first section including a pivotal support for pivotal movement about a substantially vertical axis proximate the first end and for communicating with the airport terminal; and,
- a second section connected to the first section providing first telescopic movement for extending and retracting the aircraft engaging end;
- a wheeled gantry mounted to the second section for providing steerable movement of the second section and for lifting or lowering the aircraft facing end of the second section, the wheeled gantry comprising:
  - a wheel axle comprising two wheels mounted to either end of the wheel axle, for providing driven movement to the second section, wherein the two wheels are spaced a distance greater than the width of the second section;
  - a steering axle mounted to the wheel axle for steering between the linear movement and the arcuate movement of the second section;
  - a support beam mounted to the steering axle for supporting a lift mechanism, the lift mechanism for adjusting a distance between the support beam and the bottom of the second section, wherein the support beam is disposed between the two wheels at a height above ground less than the diameter of the two wheels; and,
  - a drive mechanism for driving the two wheels.

In accordance with another aspect of the present invention there is provided a passenger loading bridge for conducting passengers or cargo from an airport terminal to an aircraft entry door of an aircraft comprising:

an extensible walkway for communicating at a first end with the airport terminal at ground level and having an aircraft engaging end at an opposite end, the walkway comprising:
  a first section including a pivotal support for pivotal movement about a substantially vertical axis proximate the first end and for communicating with the airport terminal;
  a second section connected to the first section providing first telescopic movement for extending and retracting the aircraft engaging end; and,
  a third section connected to the second section providing second telescopic movement for extending and retracting the aircraft engaging end;
  a wheeled gantry mounted to the third section for providing steerable movement of the third section and for lifting and lowering the aircraft facing end of the third section, the wheeled gantry comprising:
    a support beam for supporting a lift mechanism, the lift mechanism for adjusting a distance between the support beam and the bottom of the third section;
    a steering mechanism mounted to the support beam for steering between the linear movement and the arcuate movement of the third section;
    a wheel axle mounted to the steering mechanism, the wheel axle comprising two wheels mounted proximate opposing ends of the wheel axle, for providing linear and arcuate movement to the third section, wherein the distance between the two wheels exceeds the length of the support beam, and wherein the diameter of the two wheels exceeds a height above ground of a bottom of the support beam; and,
    a drive mechanism for driving the two wheels.

BRIEF DESCRIPTION OF FIGURES

Exemplary embodiments of the invention will now be described in conjunction with the following drawings, in which:

FIG. 1a is a side view of a loading bridge interfacing a terminal and an aircraft;

FIG. 1b is a simplified diagram illustrating the geometry of the loading bridge shown in FIG. 1a;

FIG. 2b is a top view of the embodiment of FIG. 2a;

FIG. 3b is a plan view of the embodiment of FIG. 3a;

DETAILED DESCRIPTION OF PREFERRED EMBODIMENTS

Figure 1B:
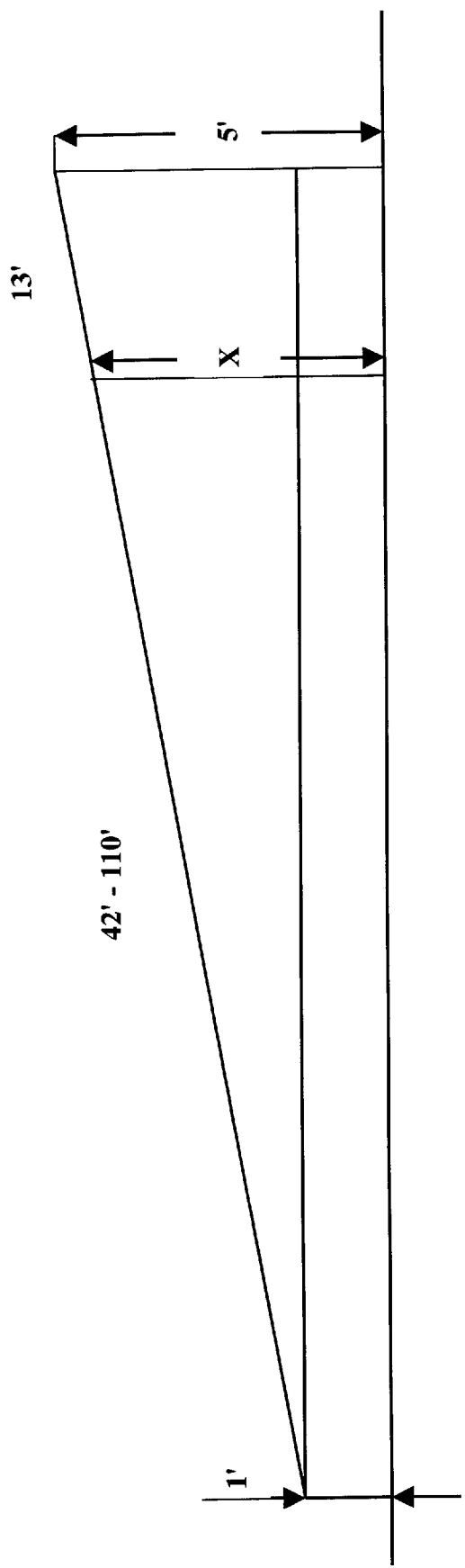
Figure 1C:
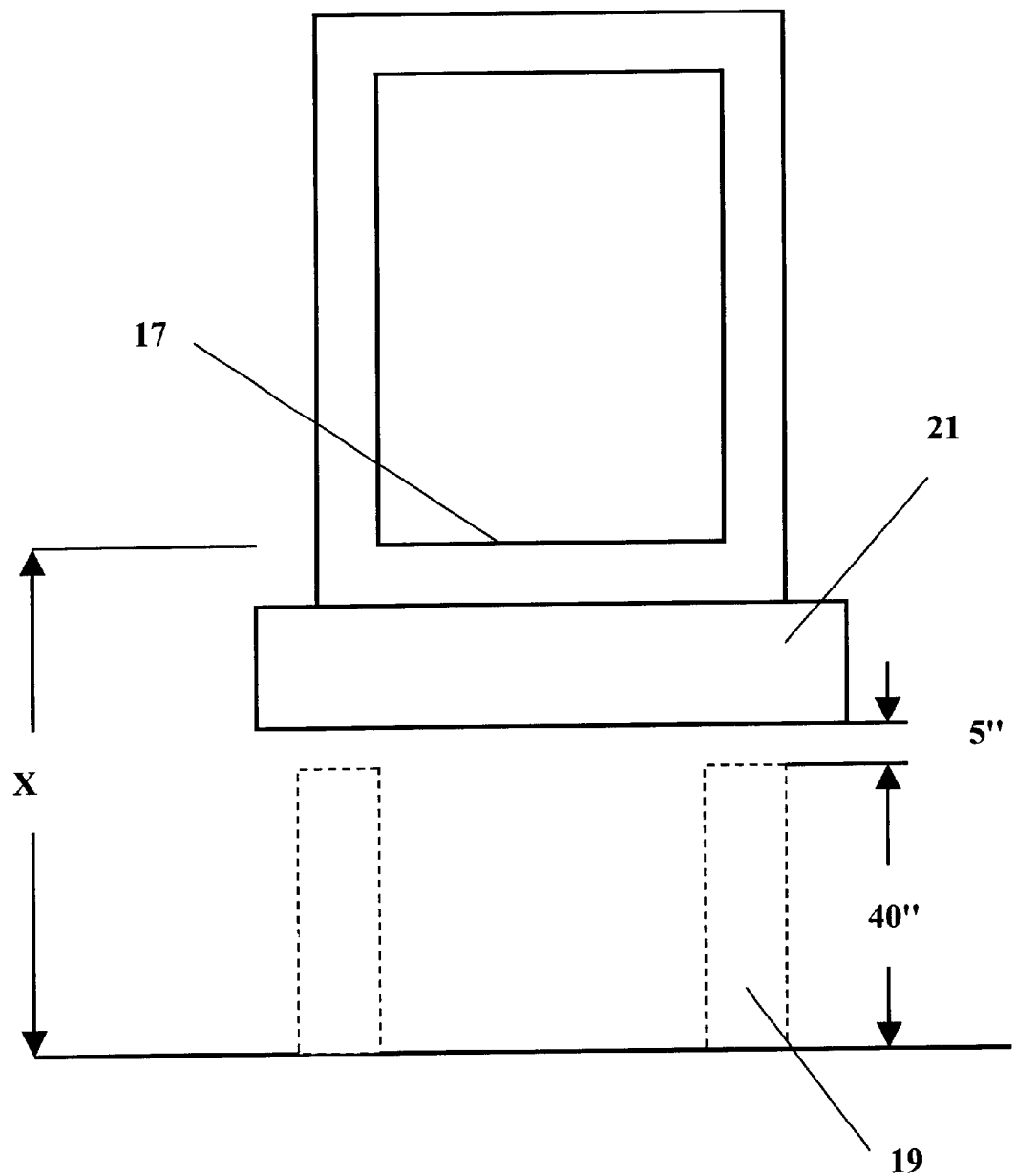
FIG. 1c is a cross sectional view of the loading bridge at the aircraft facing end of the third section.

FIGS. 1a to 1c illustrate the basic geometry of a passenger loading bridge 9 that is connected to an airport terminal 7 at ground level—approximately 1 foot above ground level to provide sufficient height for structural members below rotunda 8. In order to service smaller airplanes such as commuter aircraft the floor-level of aircraft interface section 11 has to be lowered to a height of 5 feet or less, as shown in FIG. 1b. For coupling the passenger loading bridge to smaller aircraft the aircraft interface section 11 has to have a sufficient length for providing necessary functionality such as rotational and telescoping movement of the aircraft interfacing end 15. Furthermore, sufficient clearance between the gantry 13 and the aircraft 5 has to be provided by the cantilever like supported aircraft interface section 11 in order to allow personnel access to various portions of the plane such as doors for loading cargo, fuelling caps, ports for ventilation, electricity, etc. For an aircraft interface section 11 having a length of 13 feet and a passenger loading bridge 9 having a length between 42 and 110 feet the clearance X between the floor level 17 and ground varies between 48.5 inches and 55 inches, as shown in FIGS. 1b and 1c. In order to provide reliable operation on uneven ground or in snow and ice it is desirable to use wheels of approximately 40 inches in diameter. Using a prior art gantry as shown in FIG. 1c leaves a clearance Y between the wheels 19 and the floor level 17 of only 8.5 inches to 15 inches for a loading bridge length of 42 to 110 feet. Furthermore, save operation of the wheels requires a minimum clearance of approximately 5 inches between the wheel and a gantry support 21, leaving only 3.5 inches to 10 inches for the support structure of the passenger loading bridge. As is evident to a person of skill in the art this is definitely not sufficient for any practical solution.

Figure 2A:
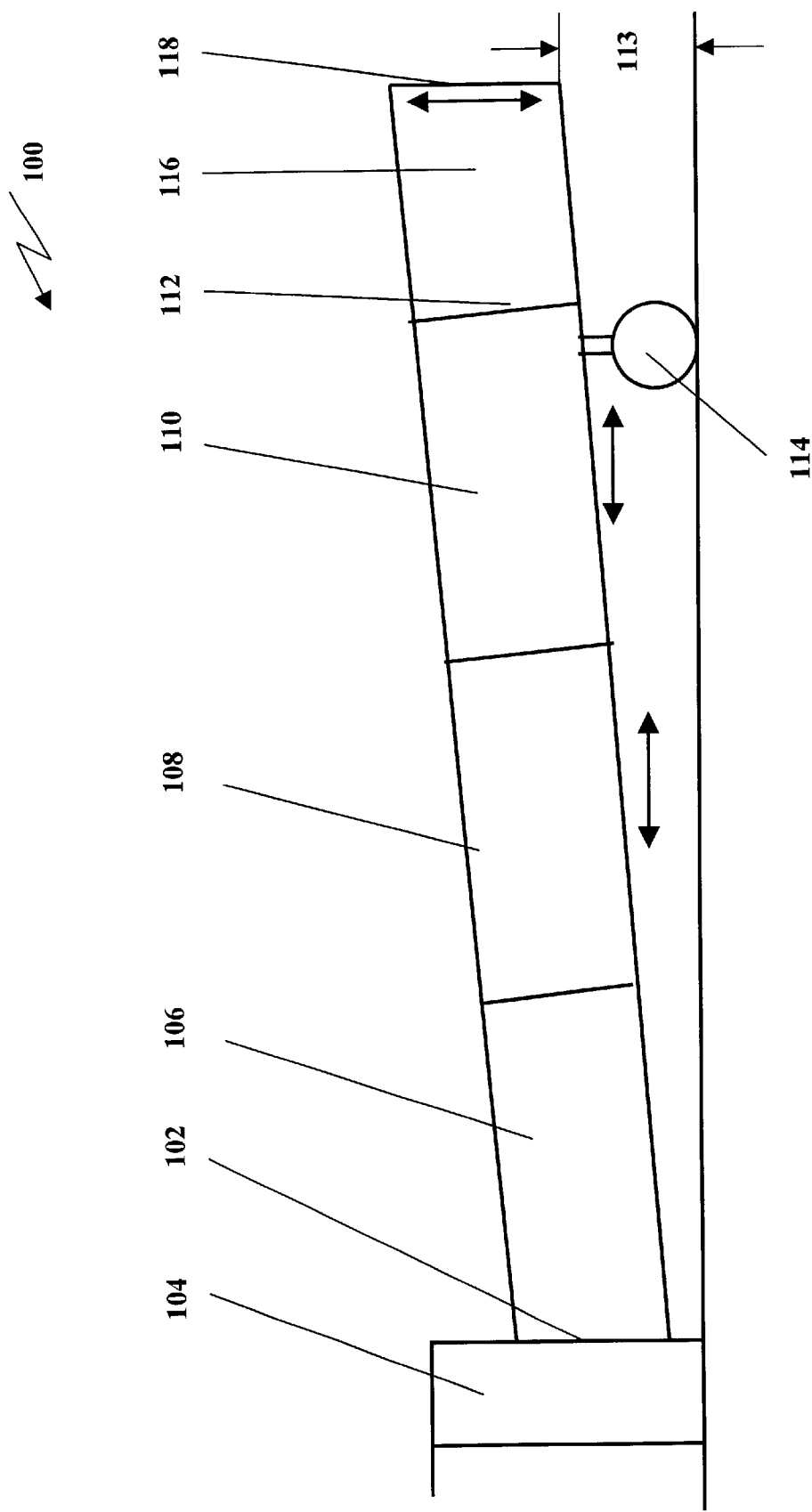
FIG. 2a is a side view of a preferred embodiment of the present invention illustrated in a fully extended position.
Figure 2B:
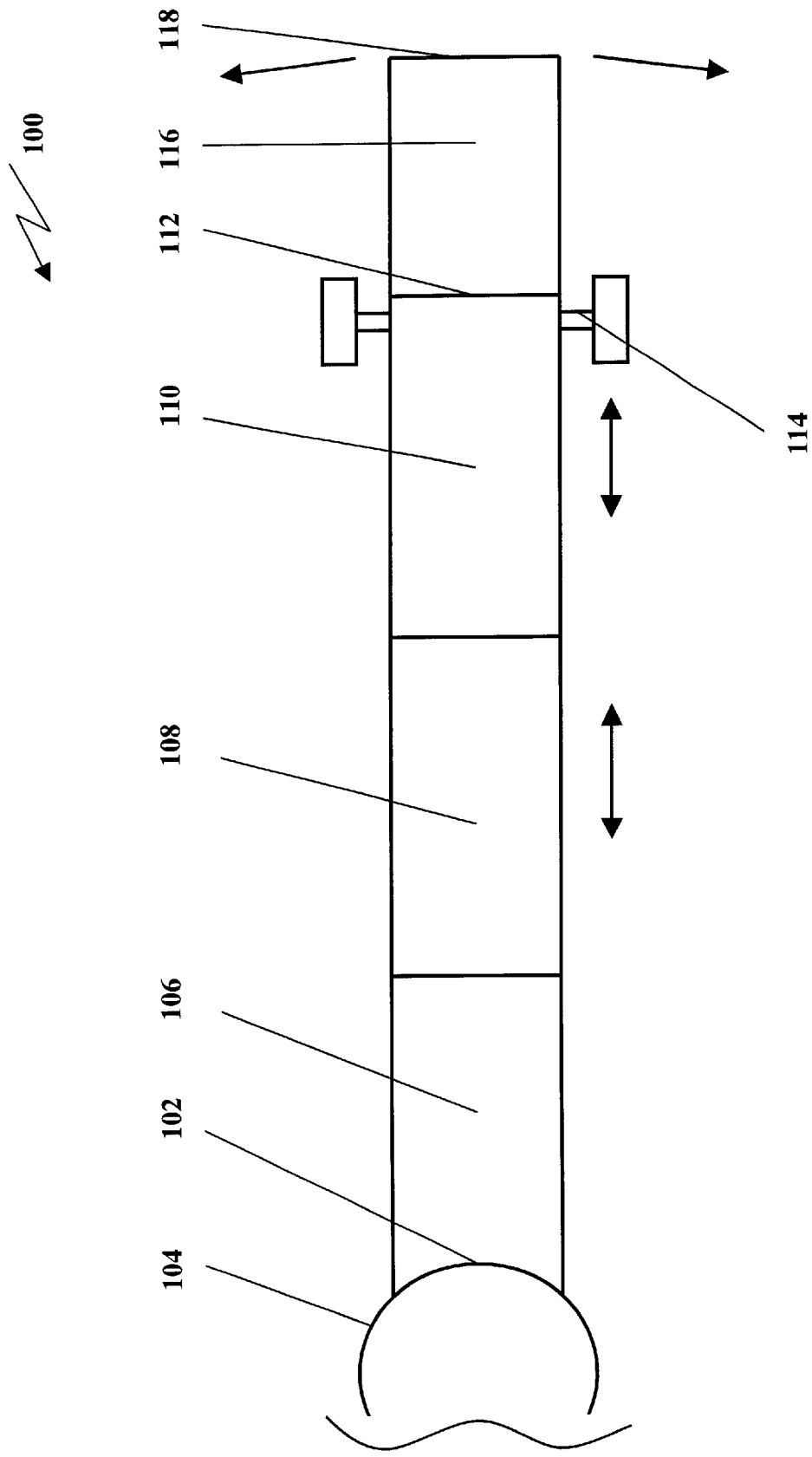
Figure 2C:
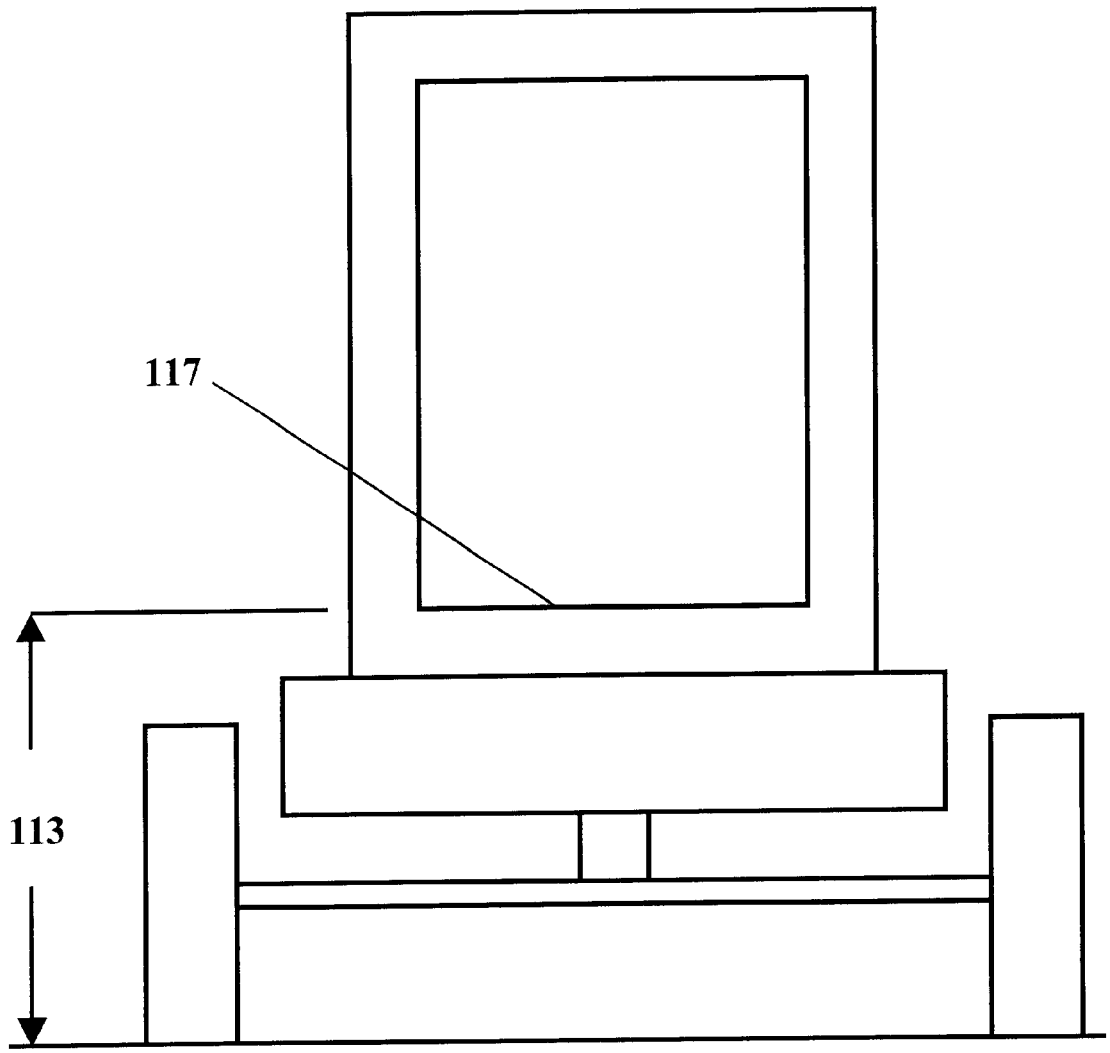
FIG. 2c is a cross sectional view of the loading bridge, shown in FIG. 2a, at the aircraft facing end of the third section.
Figure 3A:
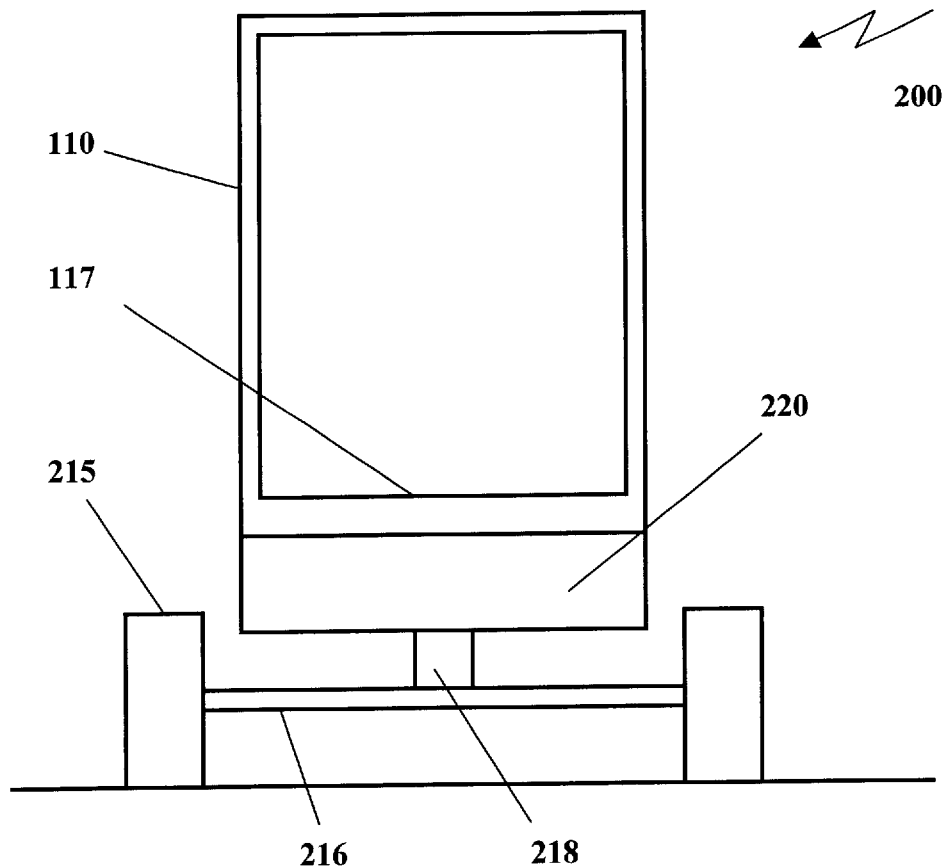
FIG. 3a is a cross sectional view of a preferred embodiment of a wheeled gantry according to the present invention.
Figure 3B:
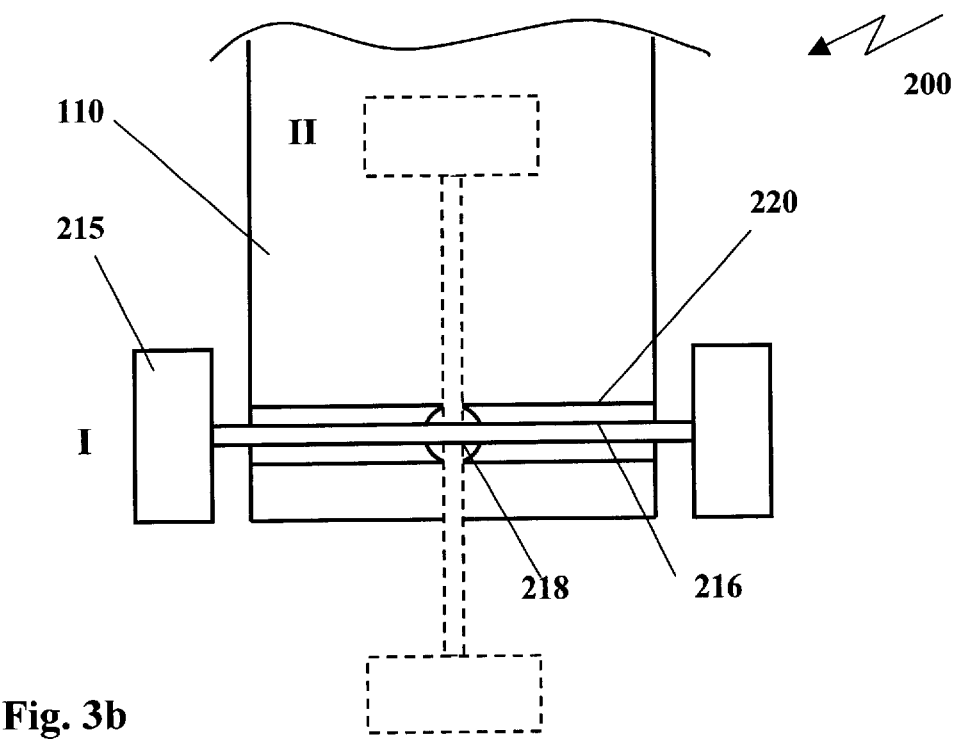

The loading bridge according to the present invention is shown generally at 100 in FIGS. 2a and 2b. The loading bridge 100 is supported at a terminal end 102 by a rotunda 104 at approximately 1 foot above ground level. The 1 foot of clearance provides sufficient height for structural members below the rotunda. Of course, the rotunda may be higher or lower relative to the ground depending on installation and other design concerns. The rotunda 104 communicates with the airport terminal (not shown) through a simple passageway, or an additional walkway of desired length (not shown). The rotunda 104 is fixed and supports the terminal end 102 of the loading bridge 100 for hinged movement about a horizontal axis for height adjustment, and also for pivotal movement about a vertical axis through the rotunda 104. Rotation may be about a central axis or an eccentric axis. The rotunda 104 remains enclosed by flexible curtains during movement of the passenger loading bridge 100 maintaining protection from the elements. The walkway includes three telescopic sections 106, 108, and 110 providing an extended total length of approximately 110 feet. Preferably, the three telescopic sections are of approximately equal length. If more expansion is necessary additional telescoping sections may be added. Optionally, the walkway comprises only two telescopic sections 106 and 110. However, the use of only two telescopic sections is considerably reducing the ability to expand/retract the loading bridge. The walkway is supported by a wheeled gantry support 114 positioned adjacent the aircraft facing end 112 of the third section 110. The third telescopic section 110 supports at its aircraft facing end 112 an aircraft interface section 116 for communicating with an aircraft entry door in a cantilever like manner. Having an aircraft interface section 116 of sufficient length provides sufficient distance to allow servicing of an aircraft, for example, refueling, ventilating or loading cargo without interference of the gantry. For example, having an aircraft interface section 116 of approximately 13 feet provides a distance of approximately 13 feet between the gantry and the aircraft. The length of approximately 13 feet of the aircraft interface section 116 provides a sufficient work area as well as security for aircraft service personnel in an already dangerous environment. Furthermore, it allows moving of the loading bridge into position for supporting an aircraft while airport service personnel is already servicing the aircraft. In order to support aircraft of various sizes the loading bridge has to be lifted or lowered. For supporting smaller aircraft such as commuter aircraft the minimum distance 113 of an inside floor level 117 of the aircraft interfacing section 116 at the aircraft facing end 118 to ground level preferably does not exceed 5 feet, as shown in FIGS. 2a and 2c. This requirement limits the available space for the wheeled gantry support 114 between the inside floor level of the third section 110 and ground level to approximately 48.5 to 55 inches, as outlined above. In order to provide reliable operation on uneven ground or in snow and ice it is desirable to use wheels of approximately 40 inches in diameter. A detailed cross sectional view of a preferred embodiment of a simple wheeled gantry support 200 according to the invention is shown in FIGS. 3a and 3b. The wheeled gantry 200 comprises two wheels 215 of approximately 40 inches in diameter affixed to an axle 216 which is rotationally affixed to support beam 220 by a steering mechanism 218. The length of the axle 216 extends the length of the support beam 220 such that the support beam 220 is placed between the two wheels 215. This allows optimal use of the limited space between the inside floor level 117 of the telescopic section 110 and ground level. The axle 216 is steerable from position I, shown in FIG. 3b, for extending or contracting the loading bridge—sections 108 and 110—to position II for arcuate movement around a vertical axis of the rotunda 104 as indicated in FIG. 2b. As is obvious to a person of skill in the art, the steering mechanism 218 may comprise, for example, a toothed wheel drive or a hydraulic drive. Alternatively, steering action is provided by independently driving the wheels 215 using separate motor drives for each of the wheels 215. A drive such as an electric motor for driving the wheels 215 may be mounted directly on the axle 216 driving wheels 215 mounted rotationally thereto or mounted to the support beam 220 using a power transmission system.

Figure 3C:
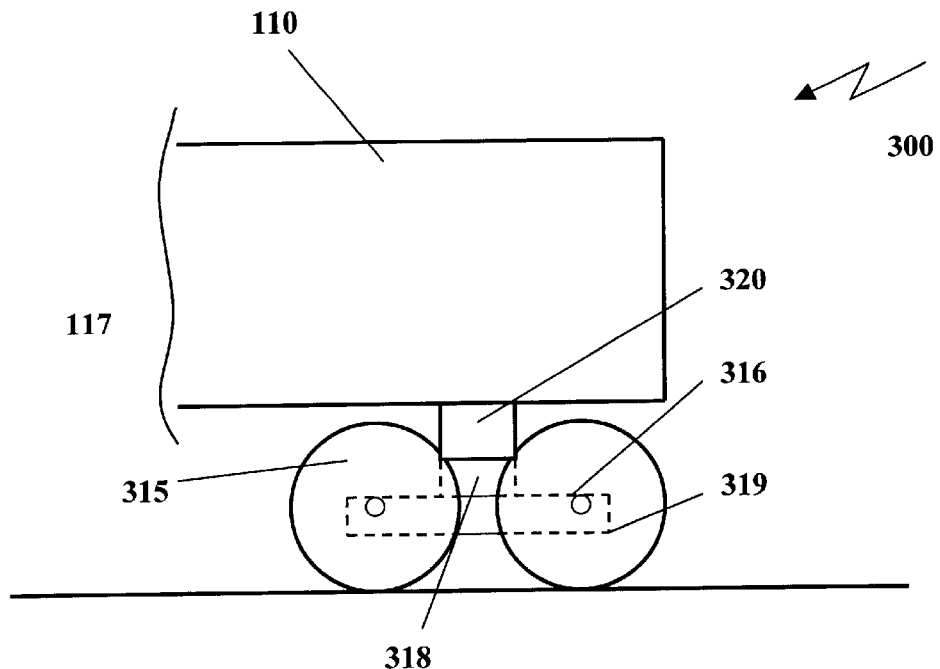
FIG. 3c is a cross sectional view of another embodiment of a wheeled gantry according to the present invention.
Figure 3D:
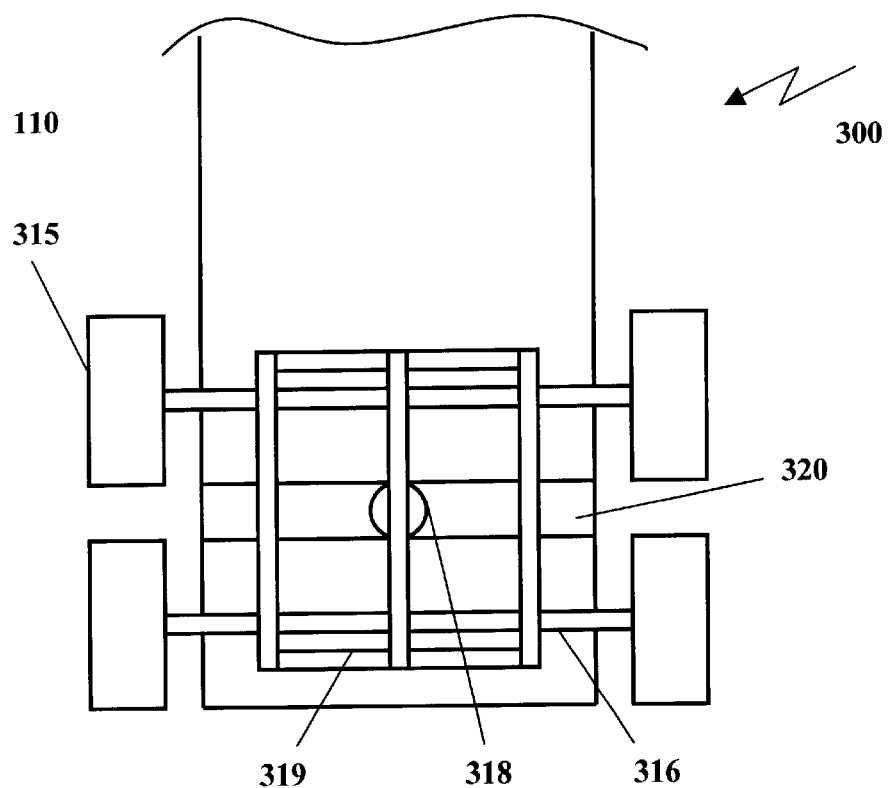
FIG. 3d is a plan view of the embodiment of FIG. 3c.

Referring to FIGS. 3c and 3d another embodiment of a wheeled gantry 300 according to the invention is shown. Two axles 316 each comprising two wheels 315 are disposed above a simple rectangular frame structure 319. The frame 319 is steerably mounted to the support beam 320 by steering mechanism 318. The gantry 300 provides a more stable support when the loading bridge is moved in an arcuate motion, substantially reducing torsional moments in the loading bridge during this operation.

Figure 3E:
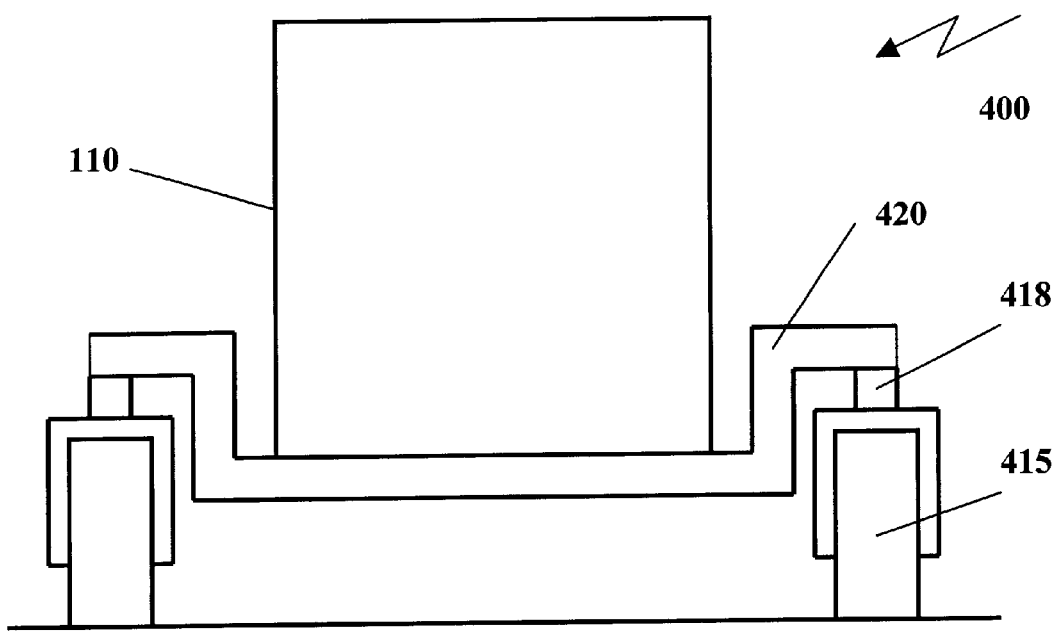
FIG. 3e is a cross sectional view of another embodiment of a wheeled gantry according to the present invention.
Figure 3F:
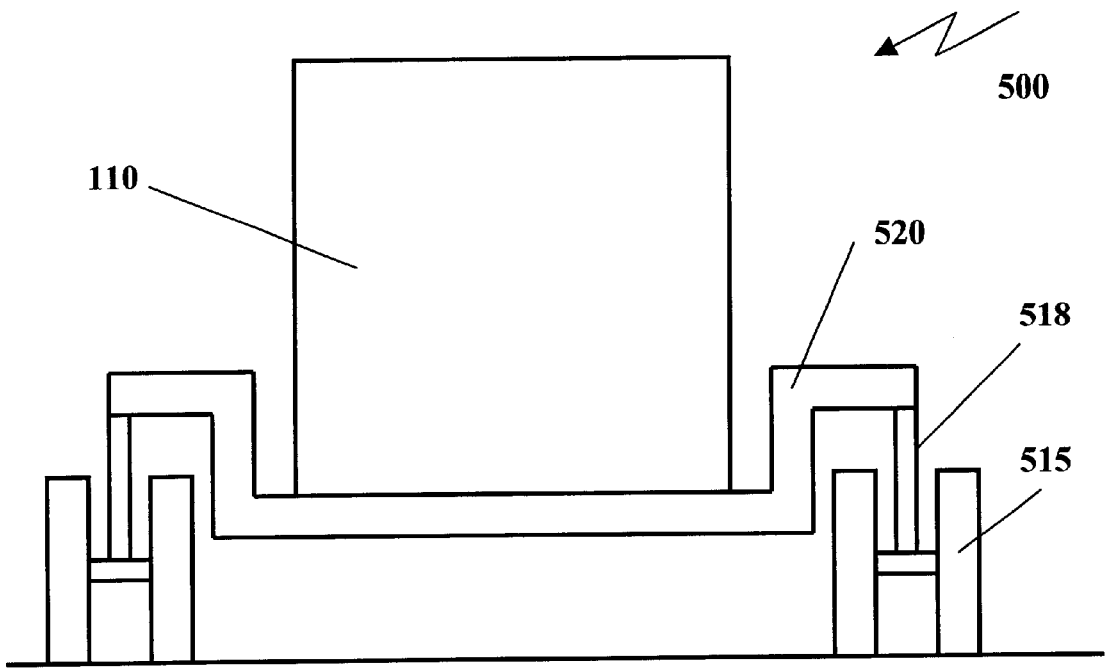
FIG. 3f is a cross sectional view of another embodiment of a wheeled gantry according to the present invention.

Referring to FIGS. 3e and 3f yet two other embodiments of a wheeled gantry according to the invention are shown. Here the support beam 420, 520 forms a U-shape surrounding the bottom portion of the third section 110 extended on either end by a cantilever. A single wheel, shown in FIG. 3e, or a pair of wheels, shown in FIG. 3f, is rotationally mounted to the cantilever extensions of the support beam 420, 520 via a steering mechanism 418, 518 on each side of the loading bridge. The wheeled gantries shown in FIGS. 3e and 3f require a more sophisticated construction than the embodiments shown in FIGS. 3a–3d but allow lowering of the loading bridge to substantially any minimum height desired while using large gantry wheels.

Figure 4A:
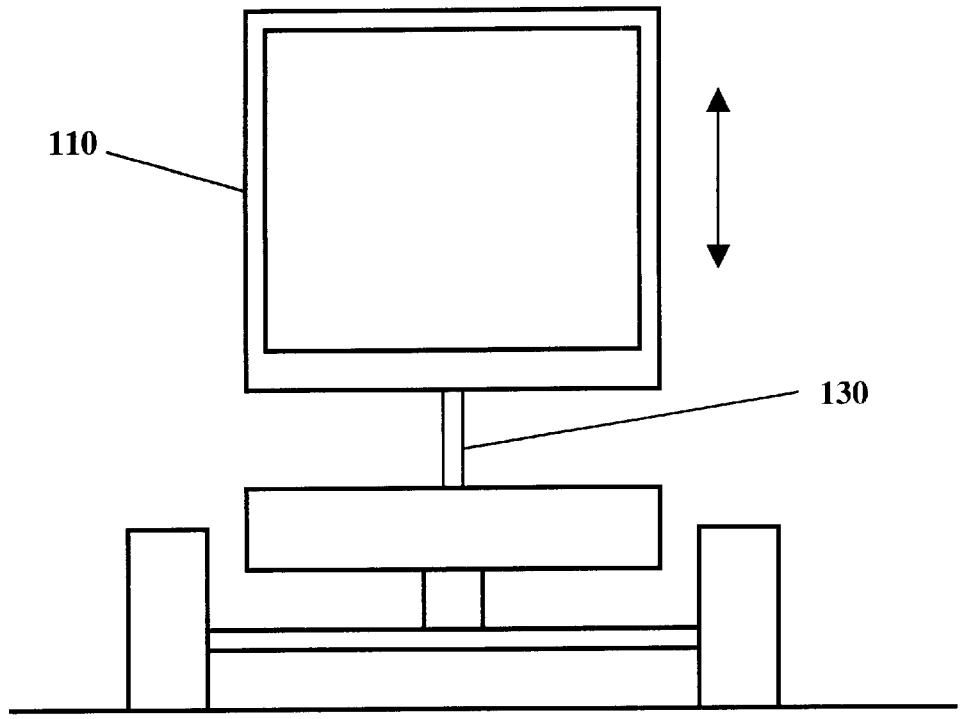
FIG. 4a is a cross sectional view of the gantry shown in FIG. 3a illustrating a lifting mechanism.

The loading bridge is lifted or lowered using a mechanical screw jack lift 130 mounted to the support beam and to the bottom of the telescopic section 110 of the loading bridge such that the action of the lift means increases or reduces the distance between the support beam and the loading bridge as shown in FIG. 4a. Other means such as hydraulic drive can be used to raise the telescopic section 110.

Figure 4B:
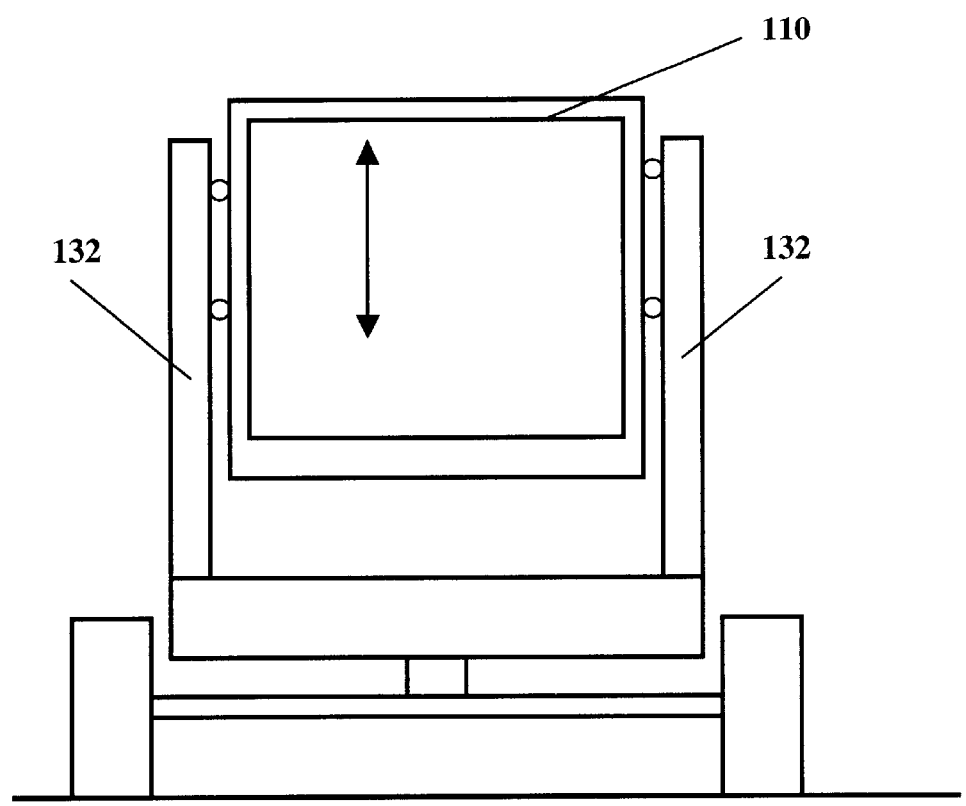
FIG. 4b is a cross sectional view of the gantry shown in FIG. 3a illustrating another lifting mechanism.

Optionally, the gantry includes standards 132 to either side of the loading bridge comprising lift means such as a mechanical screw jack lift or a hydraulic lift, as shown in FIG. 4b, for raising and lowering the aircraft facing end of the third section 110.

Figure 4C:
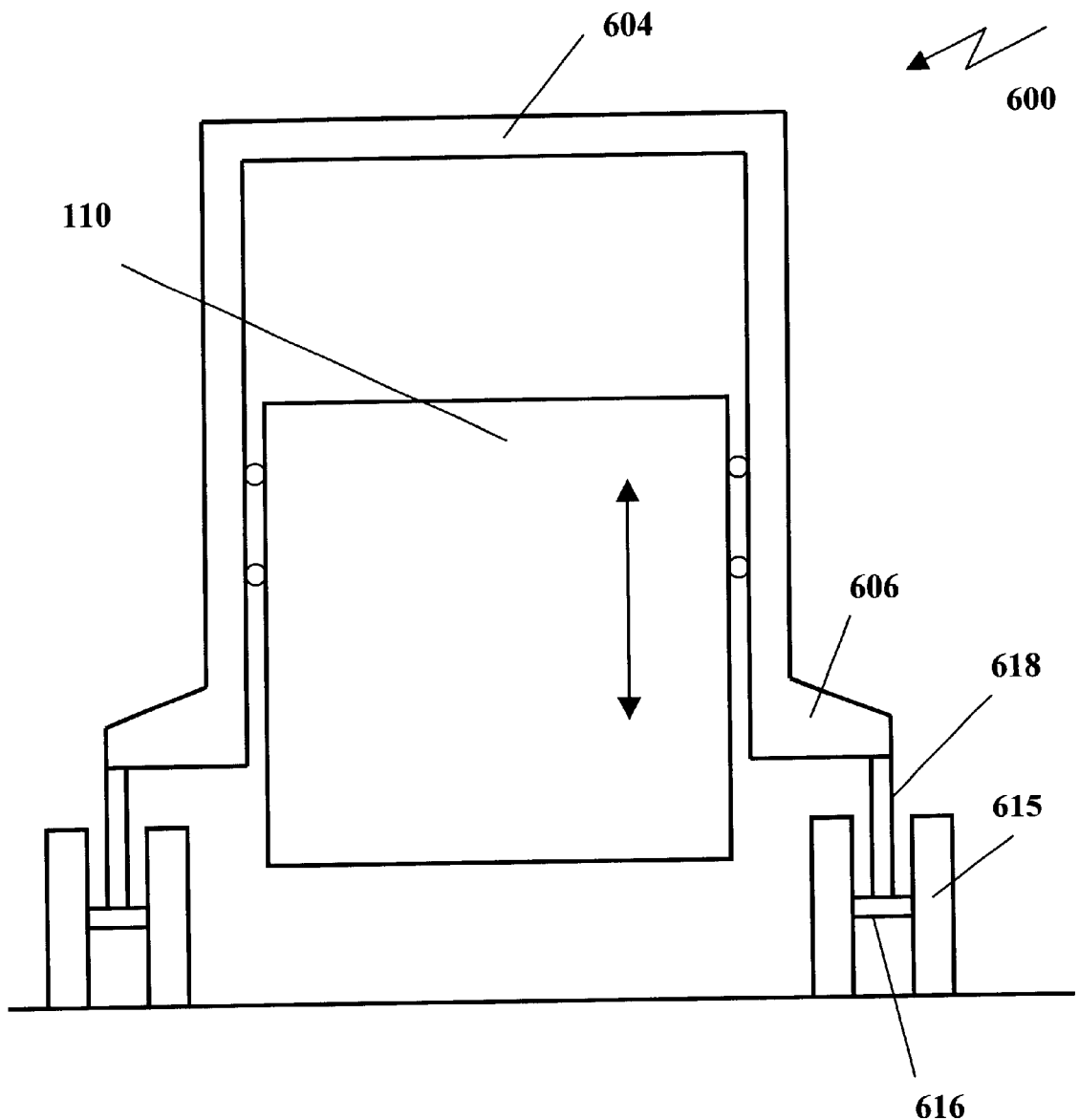
FIG. 4c is a cross sectional view of another embodiment of a wheeled gantry according to the present invention.

In yet another embodiment of a wheeled gantry 600 according to the invention a support beam 604 forms a U-shape surrounding the top and the sides of the third section 110 of the walkway, as shown in FIG. 4c. A cantilever 606 is mounted to either end of the support beam. A wheel axle 616 comprising at least a wheel 615 is mounted to each cantilever via a steering mechanism 618 for providing linear and arcuate movement to the third section. The U-shaped support beam 604 comprises a lift mechanism for lifting/lowering the aircraft facing end of the third section 110.

Numerous other embodiments of the invention will be apparent to persons skilled in the art without departing from the spirit and scope of the invention as defined in the appended claims.

What is claimed is:

1. A passenger loading bridge for conducting passengers or cargo from an airport terminal to an aircraft entry door of an aircraft comprising:

a pivotal support for pivotal movement about a substantially vertical axis;

an extensible walkway having one end connected at approximately ground level to the pivotal support for communicating with the airport terminal at ground level and having an aircraft engaging end at an opposite end, the walkway comprising:

a first section for communicating with the airport terminal; and, a second section connected to the first section providing telescopic movement for extending and retracting the aircraft engaging end; and, a wheeled gantry having a support member disposed for supporting the second section for providing steerable movement of the second section and for lifting or lowering the aircraft engaging end of the second section, the wheeled gantry including:

a support beam;

a lift mechanism including two standards, each mounted proximate either end of the support beam, the lift mechanism for adjusting a distance between the support beam and the bottom of the second section;

a wheel axle comprising two wheels mounted proximate opposite ends of the wheel axle, for providing movement to the second section, wherein the distance between the two wheels exceeds the length of the support beam and a distance between the wheel axle and the support beam is less than a radius of the wheels; and a steering mechanism mounted to the support beam for angularly displacing the wheels approximately 180 degrees in rotation, wherein placement of the wheels of the wheeled gantry allows for lowering of the gantry support member to a height above ground being approximately equal or less than a gantry wheel diameter.

2. A passenger loading bridge for conducting passengers or cargo from an airport terminal to an aircraft entry door of an aircraft comprising:

a pivotal support for pivotal movement about a substantially vertical axis;

an extensible walkway having one end connected at approximately ground level to the pivotal support for communicating with the airport terminal at ground level and having an aircraft engaging end at an opposite end, the walkway comprising:
a first section for communicating with the airport terminal; and,
a second section connected to the first section providing telescopic movement for extending and retracting the aircraft engaging end; and, a wheeled gantry having a support member disposed for supporting the second section for providing steerable movement of the second section and for lifting or lowering the aircraft engaging end of the second section, the wheeled gantry including:

a support beam for supporting a lift mechanism, the lift mechanism for adjusting a distance between the support beam and the bottom of the second section, wherein the support beam forms an approximate U-shape surrounding the top and the sides of the second section of the walkway and wherein the support beam comprises a cantilever extended from either end;

a steering mechanism mounted to each cantilever for supporting steerable movement of the second section; and, a wheel axle mounted to each steering mechanism, the wheel axle comprising a wheel mounted to the wheel axle, for supporting movement of the second section, wherein placement of the wheels of the wheeled gantry allows for lowering of the gantry support member to a height above ground being approximately equal or less than a gantry wheel diameter.

3. A passenger loading bridge for conducting passengers or cargo from an airport terminal to an aircraft entry door of an aircraft comprising:

an extensible walkway for communicating at a first end with the airport terminal at ground level and having an aircraft engaging end at an opposite end, the walkway comprising:
a first section including a pivotal support for pivotal movement about a substantially vertical axis proximate the first end and for communicating with the airport terminal; and,
a second section connected to the first section providing first telescopic movement for extending and retracting the aircraft engaging end;

a wheeled gantry mounted to the second section for providing steerable movement of the second section and for lifting or lowering the aircraft engaging end of the second section, the wheeled gantry comprising:

a wheel axle comprising two wheels mounted to either end of the wheel axle, for providing driven movement to the second section;
a steering axle mounted to the wheel axle for steering between the linear movement and the arcuate movement of the second section;
a support beam mounted to the steering axle for supporting a lift mechanism, the lift mechanism for adjusting a distance between the support beam and the bottom of the second section, wherein the support beam is disposed between the two wheels at a height above ground less than the diameter of the two wheels; and,
a drive mechanism for driving the two wheels.

4. A passenger loading bridge according to claim 3 wherein the drive mechanism comprises an independent drive for each of the two wheels.

5. A passenger loading bridge for conducting passengers or cargo from an airport terminal to an aircraft entry door of an aircraft comprising:

an extensible walkway for communicating at a first end with the airport terminal at ground level and having an aircraft engaging end at an opposite end, the walkway comprising:
a first section including a pivotal support for pivotal movement about a substantially vertical axis proximate the first end and for communicating with the airport terminal; and,
a second section connected to the first section providing first telescopic movement for extending and retracting the aircraft engaging end;

a wheeled gantry mounted to the second section for providing steerable movement of the second section and for lifting or lowering the aircraft engaging end of the second section, the wheeled gantry comprising:

a wheel axle comprising two wheels mounted to either end of the wheel axle, for providing driven movement to the second section, wherein the two wheels are spaced a distance greater than the width of the second section;
a steering axle mounted to the wheel axle for steering between the linear movement and the arcuate movement of the second section;
a support beam mounted to the steering axle for supporting a lift mechanism, the lift mechanism for adjusting a distance between the support beam and the bottom of the second section, the support beam including an upper surface for accomodating the second section and a bottom surface disposed at a height above ground being less than the diameter of the two wheels; and,
a drive mechanism for driving the two wheels.

6. A passenger loading bridge for conducting passengers or cargo from an airport terminal to an aircraft entry door of an aircraft comprising:

an extensible walkway for communicating at a first end with the airport terminal at ground level and having an aircraft engaging end at an opposite end, the walkway comprising:
a first section including a pivotal support for pivotal movement about a substantially vertical axis proximate the first end and for communicating with the airport terminal;
a second section connected to the first section providing first telescopic movement for extending and retracting the aircraft engaging end; and, a third section connected to the second section providing second telescopic movement for extending and retracting the aircraft engaging end;

a wheeled gantry mounted to the third section for providing steerable movement of the third section and for lifting and lowering the aircraft engaging end of the third section, the wheeled gantry comprising:

a support beam disposed at a height above ground for supporting a lift mechanism, the lift mechanism for adjusting a distance between the support beam and the bottom of the third section;

a steering mechanism mounted to the support beam for steering between the linear movement and the arcuate movement of the third section;

a wheel axle mounted to the steering mechanism, the wheel axle comprising two wheels mounted proximate opposing ends of the wheel axle, for providing linear and arcuate movement to the third section, wherein the distance between the two wheels exceeds the length of the support beam, and wherein the diameter of the two wheels exceeds the height above ground of a bottom of the support beam; and, a drive mechanism for driving the two wheels.

* * * * *